Aug. 16, 1966 J. H. SINK 3,266,469
ROTARY INTERNAL COMBUSTION ENGINE WITH OFF-CENTER DRIVE SHAFT
Filed Dec. 18, 1964 3 Sheets-Sheet 1
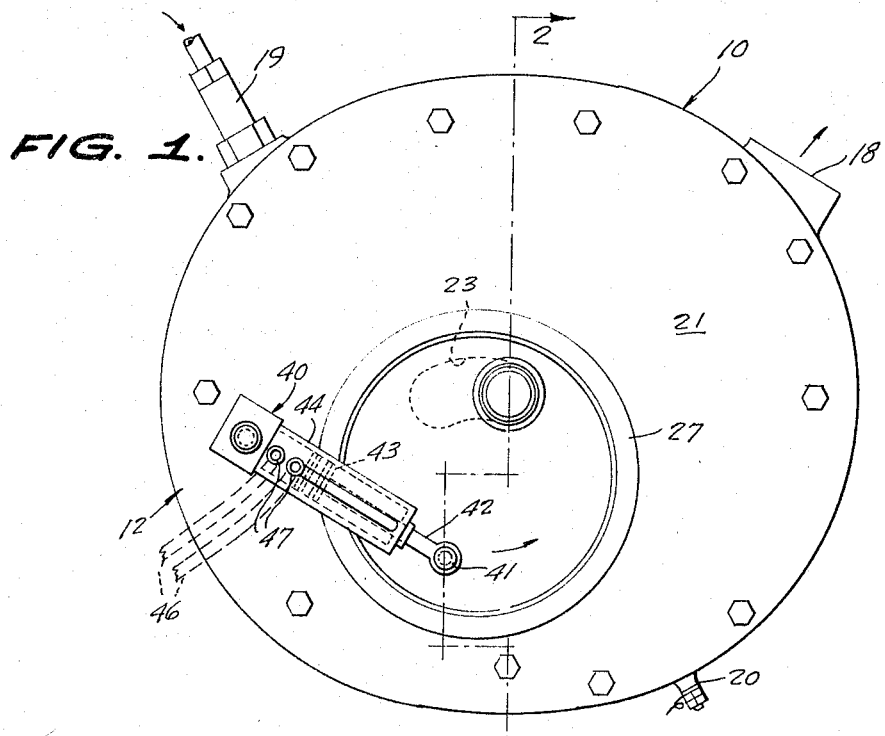
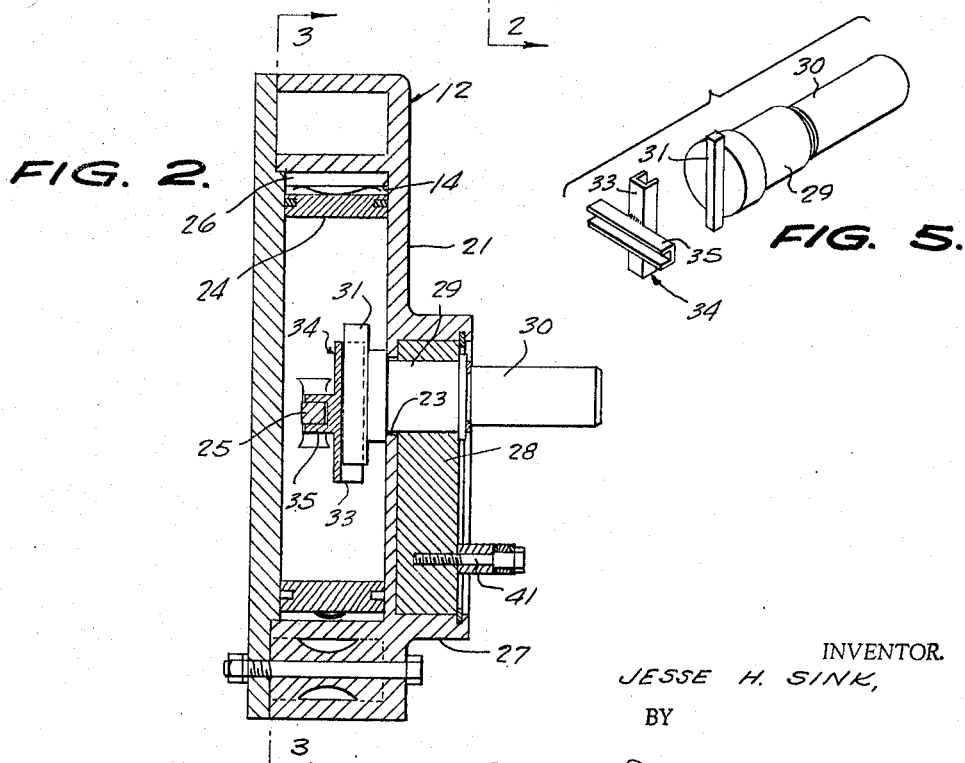
INVENTOR.
JESSE H. SINK,
BY
Berman, Davidson & Berman
ATTORNEYS.

INVENTOR.
JESSE H. SINK,
BY
Berman, Davidson & Berman
ATTORNEYS.

INVENTOR.
JESSE H. SINK,
BY
Berman, Davidson & Berman
ATTORNEYS

United States Patent Office 3,266,469
Patented August 16, 1966

1

3,266,469
ROTARY INTERNAL COMBUSTION ENGINE WITH OFF-CENTER DRIVE SHAFT
Jesse H. Sink, 2817 Hollins Road SE., Roanoke, Va.
Filed Dec. 18, 1964, Ser. No. 419,535
4 Claims. (Cl. 123—8)

This application is a continuation-in-part of application Ser. No. 337,463, filed Jan. 13, 1964, now abandoned, and has to do with an invention relating to an internal combustion engine having an off-center drive shaft.

An object of the present invention is to provide a rotary internal combustion engine wherein the torque of the drive shaft may be increased or decreased.

Another object of the present invention is to provide a rotary internal combustion engine which has a drive shaft movable to off-center positions.

A further object of the present invention is to provide a rotary internal combustion engine which is simple in construction, highly efficient in action, and commercially feasible.

Other objects and advantages of the present invention will become apparent from the following description taken in conjunction with the accompanying drawings, in which:

FIGURE 1 is a front view of a rotary internal combustion engine according to the present invention.

FIGURE 2 is a sectional view taken on the line 2—2 of FIGURE 1.

FIGURE 5 is an exploded view of the drive shaft and the means connecting the shaft to the rotor.

Figure 3:
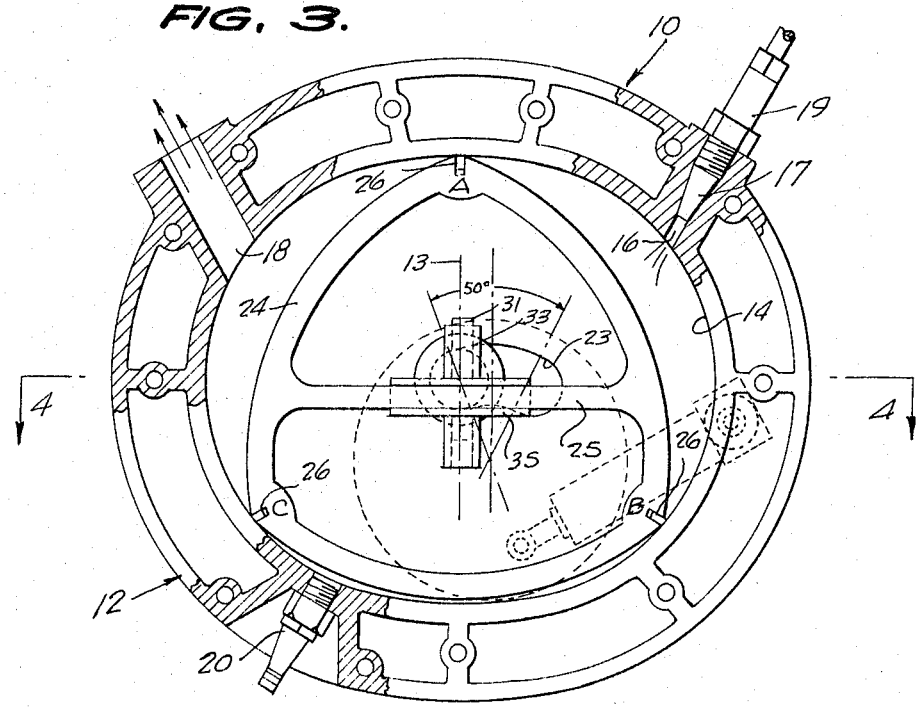
FIGURE 3 is a sectional view, with parts broken away, taken on the line 3—3 of FIGURE 2.
Figure 4:
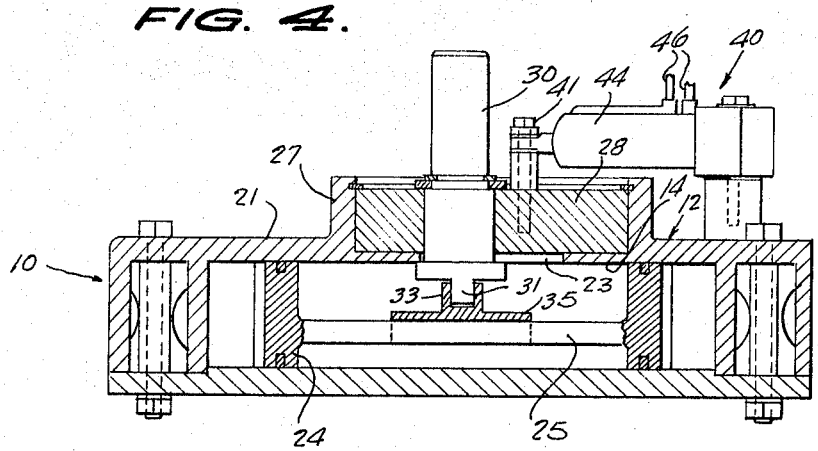
FIGURE 4 is a sectional view taken on the line 4—4 of FIGURE 3.

Referring to the drawings, the numeral 10 generally designates a rotary internal combustion engine according to the present invention, the engine comprising a housing 12 which is provided with a rotor-receiving cavity 14 of oval shape, the cavity having an axis 13. The housing 12 is provided with an inlet port 16 and an outlet port 18 arranged in spaced relation about and in communication with the cavity 14. The inlet port 16 houses a fuel injection nozzle 17 which is in communication with a pipe 19 carrying a supply of fuel under pressure. An igniting means or spark plug 20 is carried by the housing 12 and is in communication with the cavity 14 and is located between the inlet and outlet ports 16 and 18.

A rotor 24 is provided which is shaped to a size to be received within the cavity 14 and the housing 12 and has a plurality of vanes 26 projecting in spaced relation from the perimeter thereof. The rotor 24 is disposed within the cavity 14 with its vanes 26 in contacting engagement with the wall of the cavity. Specifically, the rotor is shaped to a triangle and the vanes 26 project from the apices thereof, as shown clearly in FIGURE 3. The rotor 24 is provided with a cross-driving bar 25, the purpose of which will become subsequently apparent.

A disc 28 is rotatably mounted in a hub 27 projecting from the front face 21 of the housing 12, the front face 21 taking the form of a cover plate which extends over and closes such front face. The front face or cover plate 21 is provided with an arcuate slot 23. A drive shaft 30 extends through and is eccentrically and rotatably-mounted in the disc 28, the shaft having one end portion extending through the slot 23 in the cover plate 21 and into the housing 12 with the one end adjacent the rotor 24. The portion adjacent the other end of the drive shaft 30 projects out of and is externally of the hub 27. On the one end of the shaft 30 is a head 29 from which projects a cross-driving member 31, as clearly shown in FIGURE 5.

Means connects the rotor 24 to the said one end of the shaft 30 for rotation of the shaft 30 with the disc 28. Specifically, this means comprises a connector unit 34, FIGURE 5, which comprises a first channel element 33 and a second channel element 35 arranged in back-to-back crisscross relation with respect to the first element 33 and secured at the cross-over point to the first element 33. The first channel element 33 slidably and embracingly engages the cross-driving member 31 on the head 29 carried by the one end of the shaft 30, and the second channel element 35 slidably and embracingly engages the cross-driving bar 25 on the rotor 24.

Actuating means 40 is operatively connected to the housing 12 and the disc 28 for shifting said drive shaft to a selected position about the axis of the cavity 14. Specifically, this means, FIGURES 1 and 2, comprises a crank pin 41 projecting from the disc 28, the crank pin being connected to one end of a piston rod 42. The other end of the piston rod 42 carries a piston 43 which works within a hydraulic cylinder 44 supported from the front face or cover plate 21 of the housing. A pair of flexible hoses 46 are connected at one of their ends to spaced inlet 47 provided in the top portion of the cylinder 44. The other ends of the hoses 46 are connected to a suitable control valve, not shown. By actuating the control valve, hydraulic pressure is admitted to and withdrawn from the cylinder 44 to thereby cause reciprocating movement of the piston 43 and piston rod 42 and shifting of the shaft 30 toward and away from the center of the cavity 14.

Figure 6:
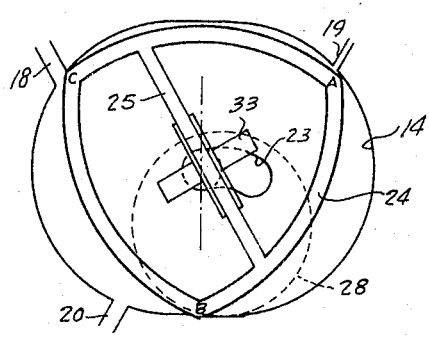
FIGURES 6 to 9 illustrate the sequential stages of the cyclic movement of the rotor through approximately 180°.
Figure 9:
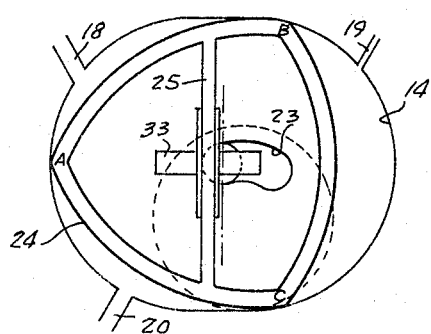
Figure 7:
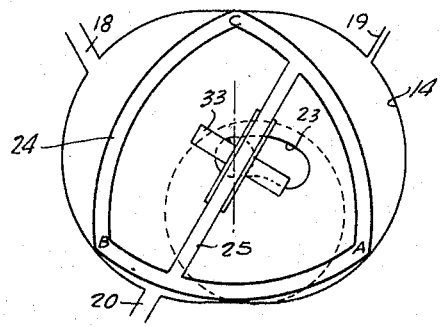
Figure 8:
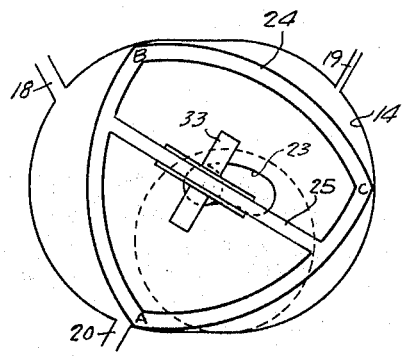

In operation, with the drive shaft 30 nearest the axis 13 of the cavity 14, the position illustrated in FIGURE 3, injected fuel flows through the nozzle 19 into the part of the cavity 14 defined between the apices A and B of the rotor 24, resulting in the collection of a charge of fuel in the space defined by the apices A and B of the rotor 24. As the rotor moves from the position of FIGURE 3 to the position of FIGURE 6, wherein the apex A is past and adjacent to the nozzle 19 and the apex B is adjacent to the spark plug 20 but between the plug 20 and nozzle 19, the fuel contained in the cavity is compressed. Upon further movement of the rotor 24 from the position of FIGURE 6 to the position of FIGURE 7, wherein the apex A is between the nozzle 19 and spark plug 20 and the apex B is between the spark plug 20 and the exhaust port 18, resulting in the charge contained in the cavity 14 being ignited and exploded. Upon further movement of the rotor 24 from the position of FIGURE 7 to the position of FIGURE 8, wherein the apex A is adjacent the spark plug 20 and between the spark plug 20 and the nozzle 19 and apex B is between the exhaust port 18 and nozzle 19, resulting in the exploded gas contained in the cavity 14 being exhausted through the exhaust port 18. Upon still further movement of the rotor 24 from the position of FIGURE 8 to the position of FIGURE 9, wherein the apex A is between the spark plug 20 and the exhaust port 18 and the apex B is between the exhaust port 18 and the nozzle 19, resulting in the scavenging of the exploded gases from the cavity 14. The same operative procedure is repeated, in turn, with apices C and A, and apices B and C of the rotor 24.

Figure 10:
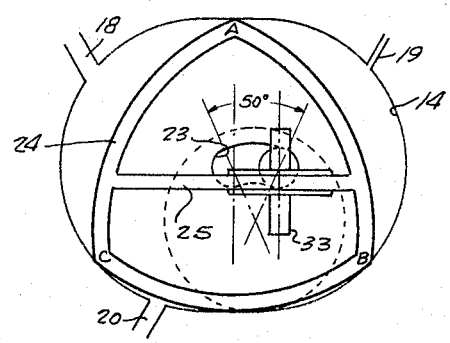
FIGURES 10 and 11 illustrate the sequential stages of the cyclic movement of the rotor when the shaft has been shifted to 50° off-center.
Figure 11:
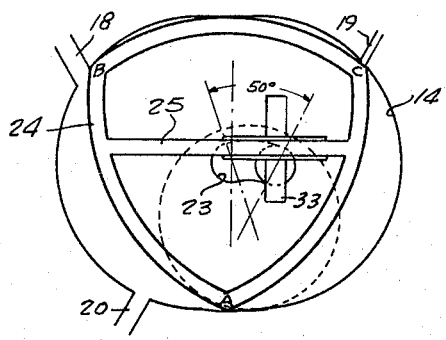

With the drive shaft 30 at an off-center position of approximately 50° with relation to the axis 13 of the cavity 14, the position of FIGURES 10 and 11, and with the drive shaft 30 at an off-center position of approximately 50° with relation to the axis 13 of the cavity 14, the position of FIGURES 10 and 11, the rotor 24 operates in the same manner as above-described for the drive shaft 30 nearest the axis 13 of the cavity 14 and graphically illustrated in FIGURES 6 to 9, inclusive.

It is to be noted that with the drive shaft 30 nearest the axis 13 of the cavity 14, the position of FIGURE 3, and FIGURES 6 to 9, the shaft 30 is driven at the highest speed but exerting the lowest torque, whereas with the drive shaft 30 at an off-center position of approximately 50° with relation to the axis 13 of the cavity 14, the position of FIGURES 10 and 11, the shaft 30 is driven at the lowest speed but exerting the highest torque.

What is claimed is:

1. A rotary internal combustion engine comprising a housing provided with a rotor-receiving cavity, there being an inlet port and an outlet port in said housing arranged in spaced relation about and in communication with said cavity, igniting means carried by said housing and in communication with said cavity and located between said inlet and outlet ports, a rotor shaped to a size to be received within said cavity and having a plurality of vanes projecting in spaced relation from the perimeter thereof disposed within said cavity with its vanes in contacting engagement with the wall of said cavity, a disc rotatably mounted in said housing adjacent said rotor, a drive shaft extending through and eccentrically and rotatably-mounted in said disc and having one end adjacent said rotor and having the other end exteriorly of said housing, means connecting said rotor to said one end of said shaft for rotation of said shaft in said disc, and actuating means operatively connected to said housing and disc for shifting said drive shaft to a selected position about axis of said cavity.

2. The rotary internal combustion engine according to claim 1, wherein said cavity is of oval shape, and wherein said rotor is shaped to a triangle with the vanes projecting from the apices of said triangle.

3. The rotary internal combustion engine according to claim 2, wherein said connecting means comprises a connection unit having a first channel element slidably and embracingly engaging a cross-driving bar on said rotor, and a second channel element slidably and embracingly engaging a cross-driving member projecting from said one end of said shaft.

4. The rotary internal combustion engine according to claim 1, wherein said one end of said shaft adjacent said rotor extends through an arcuate slot formed in the cover plate of said housing.

References Cited by the Examiner
UNITED STATES PATENTS

| 1,621,495 | 3/1927 | Conradson | 103—120 X |
| 2,932,255 | 4/1960 | Neukirch | 103—160 |
| 3,056,391 | 10/1962 | Hoadley. | |
| 3,196,847 | 7/1965 | Kimberley et al. | 123—8 X |

FOREIGN PATENTS

| 522,111 | 3/1921 | France. |

MARK NEWMAN, *Primary Examiner.*

F. T. SADLER, *Assistant Examiner.*